United States Patent
Stiegler

(10) Patent No.: US 8,081,794 B2
(45) Date of Patent: Dec. 20, 2011

(54) METHOD FOR IMAGING THE SURROUNDING OF A VEHICLE

(75) Inventor: Andreas Stiegler, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1152 days.

(21) Appl. No.: 11/844,890

(22) Filed: Aug. 24, 2007

(65) Prior Publication Data

US 2008/0049975 A1  Feb. 28, 2008

(30) Foreign Application Priority Data

Aug. 24, 2006 (EP) ..................... 06017669

(51) Int. Cl.
G06K 9/00 (2006.01)
(52) U.S. Cl. .......... 382/100; 382/103; 382/104
(58) Field of Classification Search .......... 382/100, 382/103, 104, 107, 224, 278; 348/143, 169; 345/7, 633; 180/168; 280/735; 367/137; 250/578.1; 701/1, 45

See application file for complete search history.

(56) References Cited

U.S. PATENT DOCUMENTS

| 5,473,364 | A | * | 12/1995 | Burt | 348/47 |
| 6,707,487 | B1 | * | 3/2004 | Aman et al. | 348/169 |
| 6,714,665 | B1 | * | 3/2004 | Hanna et al. | 382/117 |
| 2005/0012817 | A1 | | 1/2005 | Hampapur et al. | 348/143 |
| 2007/0219720 | A1 | * | 9/2007 | Trepagnier et al. | 701/300 |
| 2010/0253493 | A1 | * | 10/2010 | Szczerba et al. | 340/435 |
| 2010/0253540 | A1 | * | 10/2010 | Seder et al. | 340/905 |

FOREIGN PATENT DOCUMENTS

DE  10 2005 025 387 A1  5/2006
EP  1533653 A1  5/2005

* cited by examiner

*Primary Examiner* — Samir Ahmed
*Assistant Examiner* — Mehdi Rashidian
(74) *Attorney, Agent, or Firm* — The Eclipse Group LLP

(57) ABSTRACT

A method for imaging the surrounding of a vehicle is provided. The method includes the steps of (i) taking a series of two dimensional images of the vehicle surrounding, (ii) taking a series of three dimensional images of the vehicle surrounding that including depth information, (iii) determining at least one object in an area of interest in one of the series of images and tracking the object in the area of interest, (iv) processing the others of the series of images to retrieve object information from said other series of images, (v) adjusting the objects to be tracked in the one series of images in accordance with the object information received from processing the other series of images.

27 Claims, 6 Drawing Sheets

METHOD FOR IMAGING THE SURROUNDING OF A VEHICLE

RELATED APPLICATION

This application claims priority of European Application Serial Number 06 017 669.0 filed Aug. 24, 2006, titled METHOD FOR IMAGING THE SURROUNDING OF A VEHICLE AND SYSTEM THEREFOR; which application is incorporated in its entirety by reference in this application.

BACKGROUND OF THE INVENTION

1. Field of the Invention

This invention relates to a method for imaging the surrounding for a vehicle. The invention also relates to a cruise control system in which a control unit controls driving parameters of the vehicle.

2. Related Art

The use of image sensors, such as cameras, is proliferating in vehicles. By way of example, cameras are used in park control systems where the image sensor images the back of the vehicle to detect obstacles and to show the surrounding of the back of the vehicle to the driver. Additionally, cruise control systems have been developed in which the front of the vehicle is investigated to look for approaching objects, such as other vehicles. In these cruise control systems, the relative distance between the object moving in front of the vehicle and the vehicle must be determined. When it is determined that an object is getting too close to the vehicle, the driver may be informed or the cruise control system may even actively control the motor by decelerating or accelerating the vehicle. Conventional image sensors, such as CCD or CMOS image sensors, measure the intensity of the scene, but lacks depth information. Conventionally, three dimensional ("3D") information can be obtained by using two, two dimensional ("2D") image sensors such as CCD cameras and mathematics.

Additionally, 3D image sensors have been developed, these sensors overcoming drawbacks faced by commercially available 2D sensors. Such 3D optical measurements deliver the absolute 3D geometry of objects that are largely independent of the objects' surface reflectivity, the distance of the objects from the sensor and the illumination conditions. One example of a 3D camera is a PMD (photonic mixer device) sensor. The PMD sensor measures the distance by emitting a light signal and by calculating the time of flight of the reflected light signal. These 3D image sensors are semiconductor elements. A 3D image can be obtained by positioning several 3D sensor elements in a matrix allowing the measurement of different pixels and therefore the measurement of a complete image.

When the signal of an image sensor is to be used in systems assisting the driver by detecting objects approaching the vehicle or by tracking the vehicle in front of the image sensor, the image data has to be updated at a high rate. When the image signal should be used on highways with high velocity, frame rates (images per time) such as 100 frames/second are necessary. When a complete 2D image is calculated 100 times a second, high computing power is needed to process the images and to detect the relevant information in the images.

Accordingly, a need exists to provide a method and system for imaging the surrounding of a vehicle in which the computing power can be reduced and in which nevertheless the object detection is assured.

SUMMARY

According to implementation of the invention, a method for imaging the surrounding of a vehicle is provided. The method includes the step of taking a series of 2D images of the surrounding. Additionally, a series of 3D images of the surrounding are taken that include depth information. Furthermore, an object in an area of interest is determined in one of the series of images and the object in said area of interest is tracked. The other series of images is also processed to retrieve object information from said other series of images. The objects to be tracked in said one series of images are then adjusted in accordance with the object information received from processing the other series of images. By processing only areas of interest in one of the series, the computing power can be reduced. Due to the fact that not the complete image is processed, the processing can be focused on some areas of interest in the image. As the rest of the image is not processed, objects in the non-processed parts of the images cannot be detected.

To reliably detect new objects in the images approaching the vehicle, the other series of images is processed. If an object is detected in the other series of images, the information is transmitted to the imaging unit where the series of images is taken in which the objects are tracked in areas of interest. The object detected by processing the other series of images can then be tracked in the one series of images. Through the fusion of a standard 2D camera with a distance measurement sensor, the complexity of the imaging system may be reduced. Additionally, the quality of the object detection and the latency of the result may be optimized.

A system imaging the vehicle surrounding is also provided. The system includes a 2D image sensor generating the series of 2D images and a 3D image sensor generating 3D images of the vehicle surrounding. An image processing unit may be provided for processing one of the 2D and 3D images for detecting objects in the images to be tracked. Additionally, the image processing unit also processes the other of the 2D or 3D images to retrieve object information in the other images. The processing unit can then adjust the objects to be tracked in one of the 2D or 3D images in accordance with the object information received from processing the other images.

According to another implementation, a cruise control system for a vehicle may also be provided. The cruise control system may include a cruise control unit for controlling the engine of the vehicle. The engine of the vehicle is then controlled based on the object information received from processing one or both of the series of 2D and 3D images.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the Figures, like reference numerals designate corresponding parts throughout the different views.

DETAILED DESCRIPTION

Figure 1:
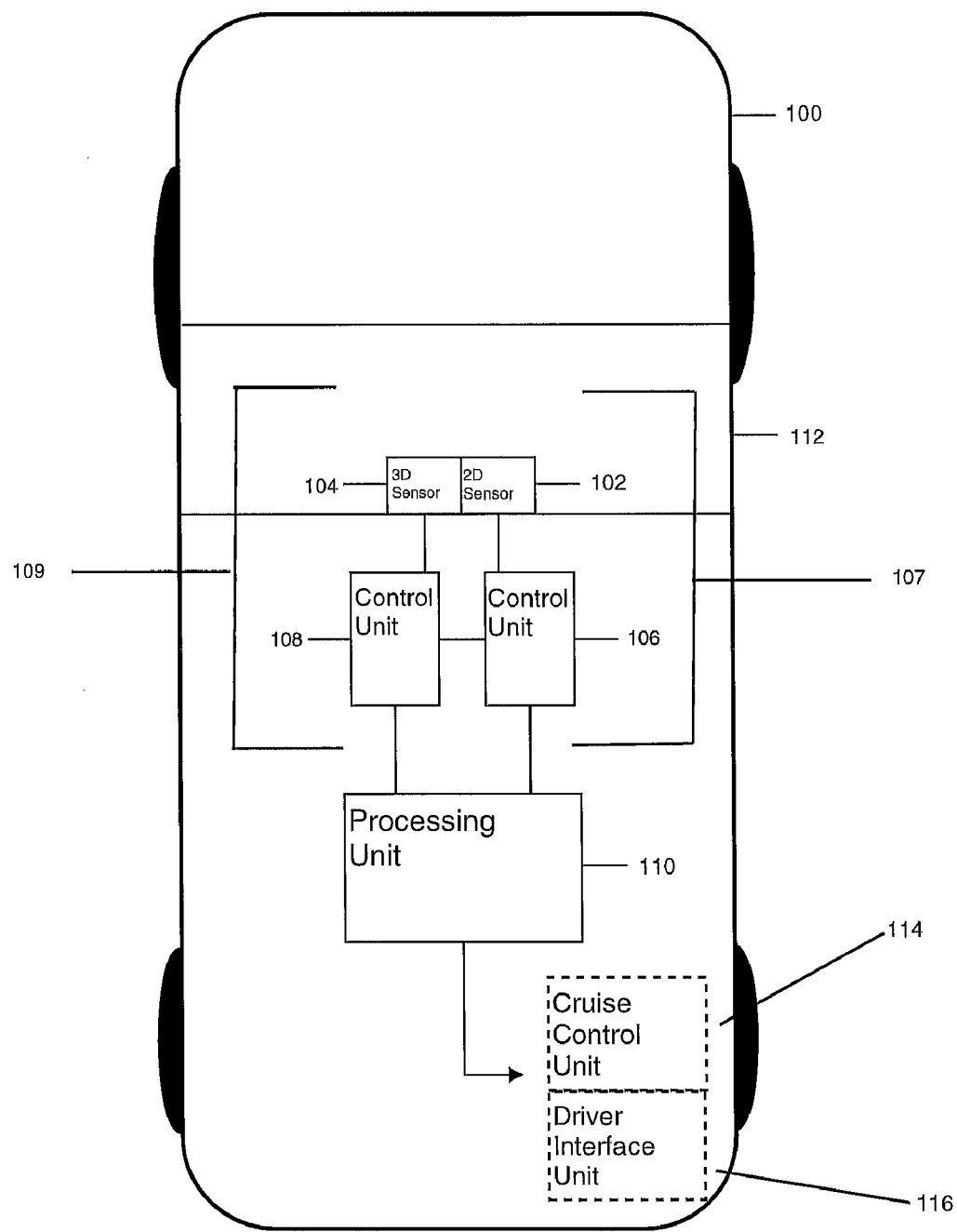
FIG. 1 shows a schematic view of a vehicle having an imaging system utilizing two different image sensors for imaging the vehicle's environment.

FIG. 1 shows a schematic view of a vehicle 100 having an imaging system utilizing two different imaging sensors for imaging the vehicle's environment. In the illustrated example, the vehicle 100 includes a two dimensional ("2D") image sensor 102 and a three dimensional ("3D") image sensor 104. The 2D image sensor 102 is connected to a 2D sensor control unit 106 and the 3D image sensor 104 is connected to a 3D sensor control unit 108. Both control units 106 and 108 are connected to a central processing unit 110 for processing the 2D and the 3D images captured by the 2D and 3D image sensors 102 and 104, respectively. Although the illustrated example shows, separate sensor control units 106 and 108 and a separate central processing unit 110, those skilled in the art will recognize that the sensor control unit 106 and 108 may be incorporated into one single unit. Similarly, both sensor control units 108 and 108 may be incorporated with the central processing unit 100 into one single control/processing unit. Furthermore, it is possible that different processing units 110 are provided for each image sensor 102 and 104. Additionally, a 3D imaging unit can be provided that includes both the 3D image sensor 104 and the 3D sensor control unit 108, the 3D sensor control unit 108 determining which of the areas in the image are processed or tracked. Furthermore, a 2D imaging unit can be provided that includes both the 2D image sensor 102 and a 2D sensor control unit 106, the 2D sensor control unit 106 controlling which parts of the 2D images are processed.

In the illustrated example, the two imaging sensors 102 and 104 are positioned behind the windscreen 112. It is, however, also possible to install the two sensors 102 and 104 behind the radiator grill (not shown) of the vehicle 100. Furthermore, the imaging sensors 102 and 104 may be provided in the position shown in FIG. 1, as well as in the front part of the vehicle 100. The 2D image sensor 102 can be a CCD or CMOS camera, generating image data at frame rates of up to 100 frames per second. This high frame rate may be necessary to reliably detect new objects when the vehicle is driving at high speed. As a 2D image sensor 102, any image sensor can be used that provides two-dimensional image data at frame rates of about 50-100 frames per second. The 3D image sensor 104 can be a PMD image sensor. In PMD sensors, a light is emitted and the light reflected from the object is detected by the sensor. Further, those skilled in the art will recognize that any other 2D image sensor 102 or 3D image sensor 104 providing pixel-based depth information may be utilized.

According to one implementation of the invention, the two different image sensors 102 and 104 are installed close to each other to ensure that the same field of view is covered by both image sensors 102 and 104. Alternatively, it is also possible to position one image sensor 102 or 104 at one location in the vehicle 100 and to position the other image sensor 102 or 104 at another location of the vehicle 100. By way of example, one image sensor 102 or 104 may be provided behind the windscreen, while the other sensor 102 or 104 may be provided in the front part of the vehicle 100 at, for example, the radiator grill. This invention is not, however, restricted to the two positions of the image sensors 102 and 104 described above. It is possible to locate the image sensors 102 and 104 anywhere in the vehicle at a position from which the field of view in front of the vehicle can be observed.

One important aspect of imaging systems imaging the surrounding of a vehicle is the detection of objects that approach the vehicle, be it another vehicle or be it a person crossing the street or be it any other object. In operation, image data is collected by the 2D and 3D sensors 102 and 104 of the vehicle 100, which is then processed and may be used to manually or automatically alter the movement, speed or relative position of the vehicle 100. In particular, the 2D and 3D series of images are processed to localize objects in a predetermined observation area of the images, the distances of which vary relative to the vehicle 100. For example, the processing unit 110 may process the images and, in the case that a crash is forecast, an alarm signal can be transmitted to a control unit, such as a cruise control unit 114 or a driver interface unit 116, indicated by the arrow shown in FIG. 1.

In one example of an implementation of the invention, if an object is detected in a series of images, the position of the object in the image and the velocity of the object relative to the vehicle 100 may be determined. This data can then be used determine whether it is necessary to react. In case of a pre-crash control, it has to be determined whether the velocity and the position of the detected object are such that the object will hit the vehicle 100. In a cruise control system, it has to be determined whether it is necessary to activate the break or to lower the acceleration or speed of the vehicle 100 to avoid a contact with the detected object or to maintain the distance to the front of the vehicle 100.

Figure 2:
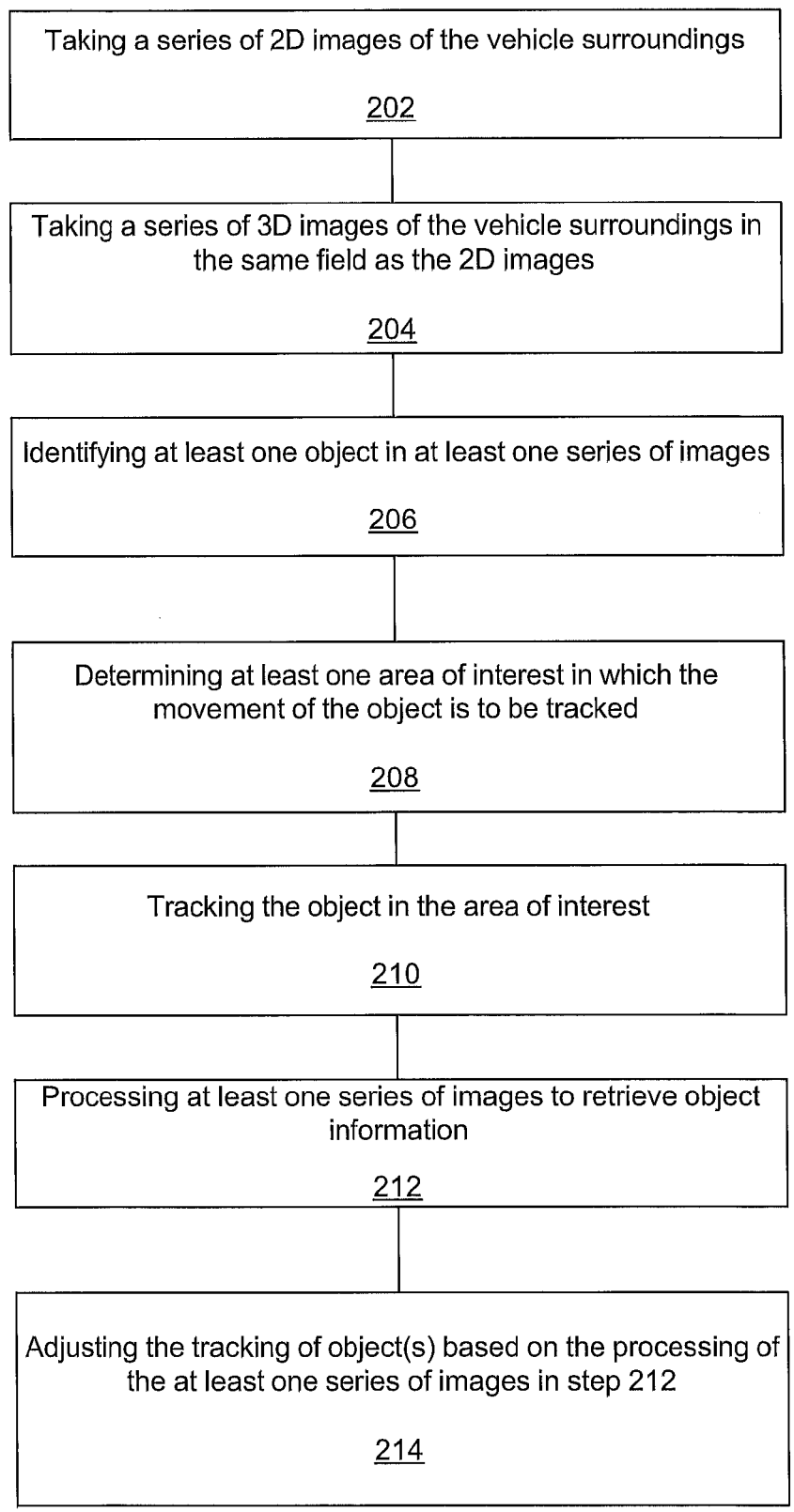
FIG. 2 illustrates one example of a method for processing the image data obtained from image sensors.

When two different image sensors are provided, such as the 2D and 3D image sensors 102 and 104 illustrated in FIG. 1, several basic methods for capturing and processing image data are possible. FIG. 2 illustrates one example of a method of capturing and processing image data. As illustrated in FIG. 1, in step 202, a series of 2D images of the vehicle surroundings are taken by the 2D sensors 102 of FIG. 1. In step 204, a series of 3D images of the vehicle surroundings are taken by the 3D image sensors 104 of FIG. 1. The 2D images and 3D images are taken in substantially the same field.

Once the series of images are taken, in step 206, the control units 106 and 108 of either or both sensors 102 and/or 104 process the respective captured series of images to identify at least one object in at least one series of images. Once an object is identified, an area of interest in which the movement of the object is to be tracked may also be determined, step 208, and the object is tracked by either or both the sensor 106 and/or 108 in the area of interest, step 210. At step 212, a second or additional series of images may be processed by either or both sensors 102 and/or 104 to retrieve further object information. The tracking of the objects by the sensors 102 and/or 104 may then be altered based upon the processing of the second or additional series of images.

As will be explained further below in connection with FIGS. 3-6, the process of identifying the object, in step 206, may be done through processing either or both the 2D or 3D series of images. Similarly, the process of retrieving object information, step 212, may also be done through processing either or both the 2D or 3D series of images. Further, the tracking of the objects by either or both the 2D or 3D sensors may be altered in step 214.

Figure 3:
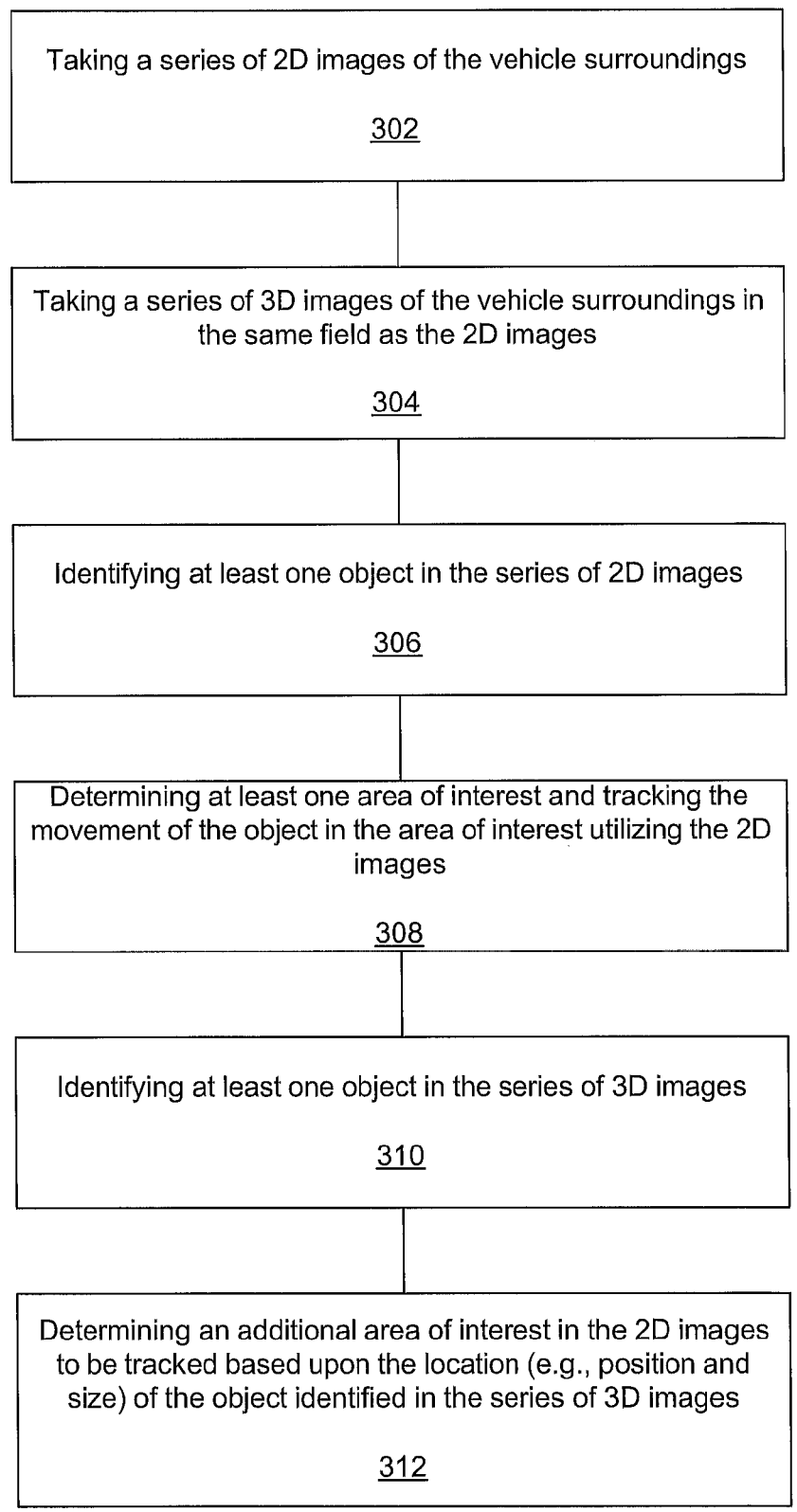
FIG. 3 illustrates another example of a method for processing the image data obtained from image sensors.

FIG. 3 illustrates one example of a method for capturing and processing image data. In the example illustrated in FIG.

3, in step 302, a series of 2D images are taken of the vehicle surroundings. In step 304, a series of 3D images are taken of the vehicle. In step 306, at least one object in the series of 2D images is identified and, in step 308, at least one area of interest is determined in the series of 2D images in which the movement of the object is to be tracked. In this case, the image is then tracked, and the 2D images are processed by taking into account and processing only parts of the image, i.e., the areas of interest, where the detected objects are present. For computing reasons, it is possible even not to read out the data for the other parts of the images.

When the 2D images are used for tracking the different objects, the distance of the objects relative to the vehicle can be determined using the 3D images. The 3D image sensors 104 normally determine the distance for all the pixels of the 3D image sensor 104. Accordingly, the 3D imaging unit or image sensors 104 can control the complete field of view for objects approaching the vehicle 100. In this case, in step 310, the 3D images may be processed to detect objects for which the distance change relative to the vehicle 100 is larger than a predetermined value. When the 2D images and the 3D images cover the same field of view, the processing of the 2D images can be concentrated on certain areas of interest in which objects were already localized. There is no need to process the other parts of the images. When the 3D imaging unit or sensor 104 (FIG. 1) taking the series of 3D images detects an object that has to be tracked, the position and size information of the detected object retrieved from the 3D images can be transmitted to the 2D imaging unit, the objects tracked in the 2D images may then be adapted to the information received from the 3D images, step 312. Accordingly, the two imaging systems together allow the supervision of the surrounding of the vehicle 100 (FIG. 1), even if not the complete image of one of the series of images is processed.

Taking into account that the number of pixels in a 2D imaging sensor can be around 600×800 and taking into account that about 100 images per second need to be processed, the needed computing power can be minimized to continually process images by concentrating on different areas of interest rather than processing the entire image all the time. The 3D image sensors 104 normally have a much lower pixel resolution than the 2D image sensors 102. By way of example, the 3D image sensors 104 may use a resolution of 48×64 pixels, which is enough resolution to detect new objects approaching the vehicle 100. The information may then be transmitted to the 2D imaging unit where the additional area of interest is tracked, comprising the object detected by the 3D imaging sensor 104. In this manner, areas of interest may be processed from the 2D images, so that processing the complete image is not necessary.

Typically, 2D images can be taken at a frame rates between 50 and 100 frames per second, whereas 3D images can be taken at a frame rate between 10 and 100 frames per second. It should, however, be understood that any other frame rates for the 2D and 3D images is possible.

According to another implementation of the method of FIG. 3, the areas of interest of the 2D images may be recorded at a first frame rate, whereas a second frame rate is used for the acquisition of the complete 2D image. A series of 3D images is also taken of the vehicle surroundings in the same field as the 2D images.

When the field of view of the complete 2D image is also observed by the 3D image sensor, it is possible to use the second frame rate to acquire the complete 2D image, which is 10 to 50 times smaller than the first frame rate. This means that, when 100 images of the tracked areas of interest are taken every second, the complete 2D image may be taken, for example, every half a second or every second. In this manner, the computing power can be reduced, as it is not necessary to take the complete 2D image every time the areas of interest are imaged. Thus, the 2D image only tracks areas of interest and receives the distance information from the 3D sensor. For example, this method may be used on streets with children playing. In this environment, an object may suddenly occur in the field of view of the imaging sensors and the 3D sensor determines the distance of the newly detected object.

Figure 4:
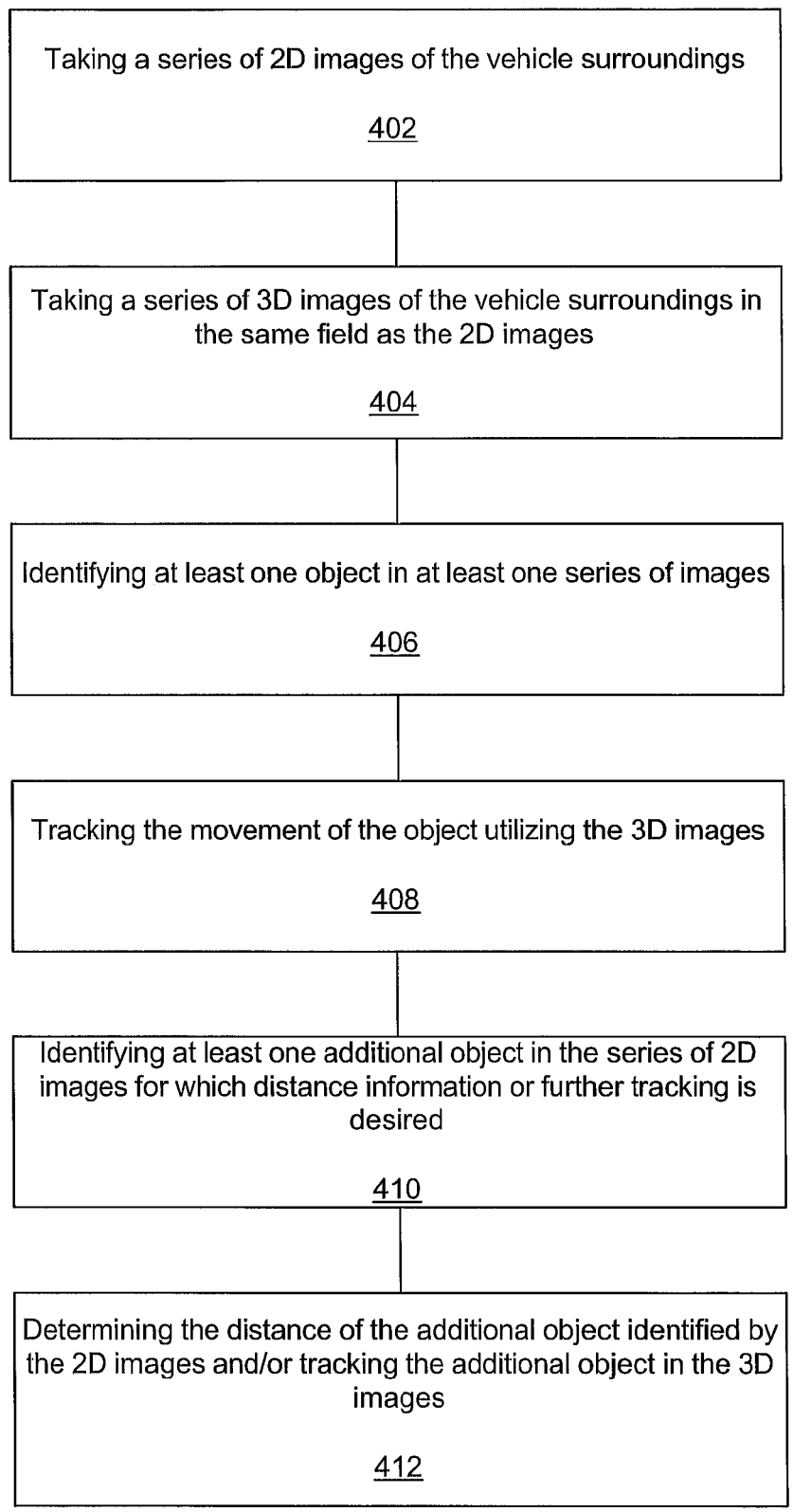
FIG. 4 illustrates yet another example of a method for processing the image data obtained from image sensors.

FIG. 4 illustrates another example of a method for processing image data. According to another method, through the use of the 2D and 3D images, objects are identified and tracked in the 3D images together with the object's position and velocity relative to the vehicle. As in the method of FIG. 3, in step 402, a series of 2D images are taken of the vehicle surroundings. In step 404, a series of 3D images are taken of the vehicle. In step 406, objects are identified for tracking in at least one of the series of images.

In step 408, the 3D image sensor tracks the predetermined objects and determines the relative distance of the objects to the vehicle. It should be understood that the 3D imaging sensor may determine the distance for all pixels of the image, however, it is also possible to concentrate on different objects and to transmit the distance of these objects to a processing unit 110 (FIG. 1) for further processing. For the 3D image sensor, the tracking of objects means that the distance is determined for all pixels, but for some objects their position and their relative velocity is determined and used for further processing. Additionally, predetermined areas of interest may be observed in the 2D images. When the 2D images are processed, a distance change can be followed from the fact that the size of an object in an observed area of the 2D images varies. By way of example, when an object tracked in the 2D images is getting larger very fast, it can be followed that the distance relative to the vehicle gets smaller.

When the processing of the 2D images results in an object for which the position has to be determined in more detail, step 410, the position of the detected object in the 2D image is transmitted to the 3D imaging unit and the relative distance of said object to the vehicle is requested and the distance is determined using the 3D images. Additionally, this newly detected object can then also be tracked using the series of 3D images, step 412. Summarizing, in this method the processing of the 2D images gives a hint to the other imaging unit for tracking an additional object, whereas in the method described in FIG. 3 above, the processing of the 3D images gives a hint for observing an additional area of interest in the 2D images.

When the imaging is used together with a pre-crash unit or a cruise control unit 114 (FIG. 1), an alarm signal may be generated when it is determined in one of the series of images that an object approaches the vehicle at a predetermined relative speed and at a relative distance to the vehicle. The driver of the vehicle may then be informed of the fact that an object is considered as being a possible threat to the vehicle through, for example, a driver interface unit 116 (FIG. 1).

For determining the objects that could be a possible danger to the vehicle, the driving direction of the vehicle may also be considered. This helps to avoid considering approaching traffic signs next to the road possible hazards to the vehicle.

Although the methods of FIG. 2 and FIG. 3 describe two different scenarios for processing of one of the images and providing additional information to the processing of the other series of images, it is also possible that both methods may be utilized together. In this regard, the image processing is not restricted in such a way that the processing is limited to one of the methods mentioned above. It is also possible that a mixture of both methods or both imaging techniques are utilized at the same time, meaning that the 3D imaging sensor provides distance information to the processing of the 2D images so that a new area of interest is observed and the 2D images or the processing of the 2D images gives a hint to the 3D image processing that another area object should be tracked with the 3D images. Depending on the traffic situation and depending on which road the vehicle drives, both processing methods described above may be used in combination.

Figure 5:
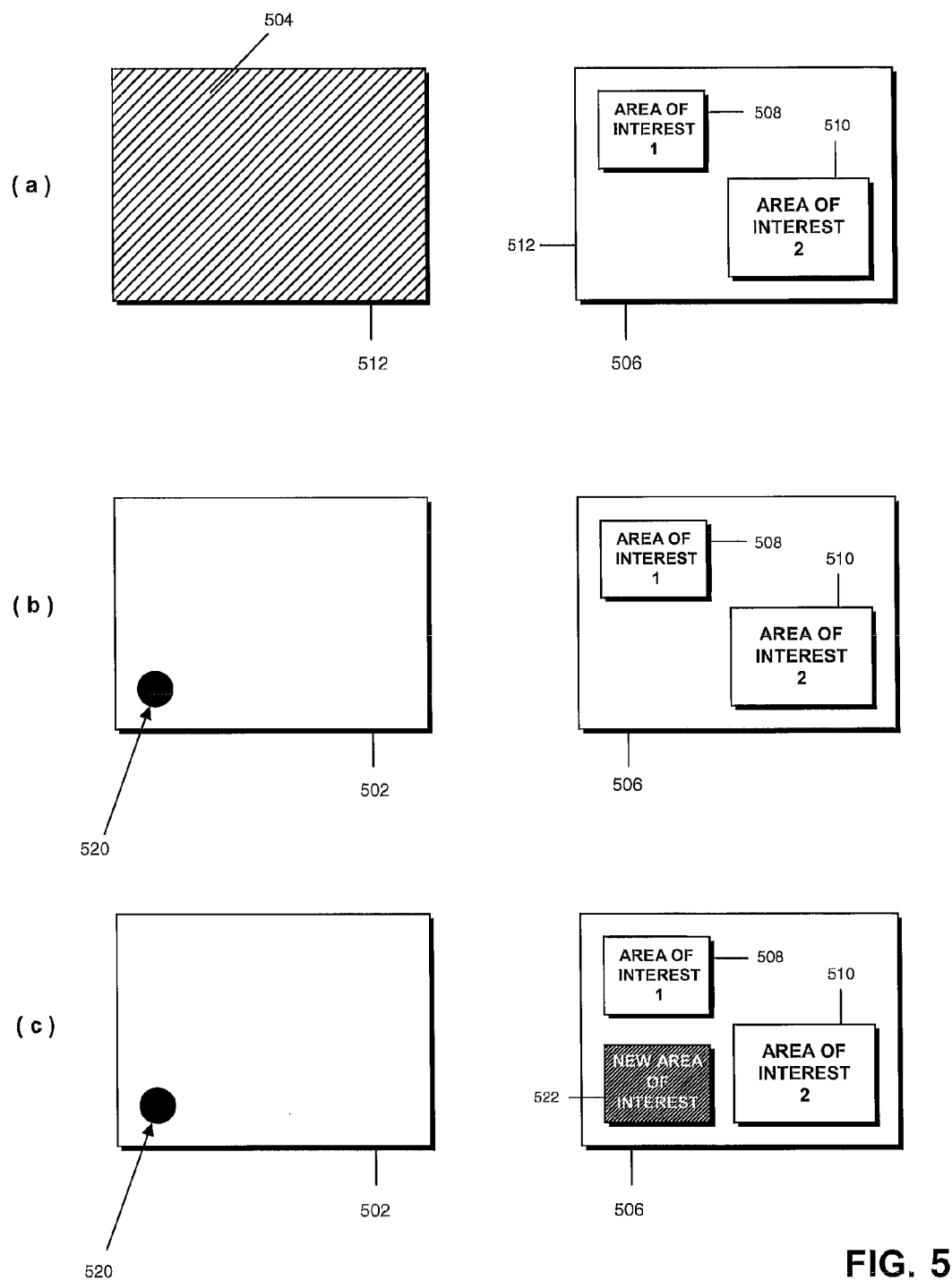
FIGS. 5a-5c show different steps in the image processing for the scenario in which the processing of the 3D images provides information to the 2D image processing regarding which part of the 2D images should be processed, as illustrated in the method of FIG. 3.

FIG. 5 illustrates one possible application of the imaging method of FIG. 3 in more detail. In FIGS. 5a-5c example implementations of images taken by a 2D sensor and a 3D sensor are shown. In FIG. 5, the images 502 show the image taken by the 3D imaging sensor such as a PMD sensor. The dashed area 504 shown in FIG. 5a indicates that the 3D sensor observes the entire field of view and that the complete image is processed to detect possible objects. The images 506 show the images taken by the 2D image sensor such as the CCD or CMOS camera. In the implementation shown in FIG. 5a, two different areas of interest 508 and 510 are observed. This means that in the images 506 only the data of the areas of interest 508 and 510 are processed. The other parts of the image 512 are not read out and further processed. The observation of the areas of interest greatly reduces the processing of the images. In one example, a 2D image is taken every 100th of a second. Most of the time only the signals of the areas of interest are processed to track an object (not shown) comprised in said area of the image.

The object in the images can be detected by using different filter algorithms applied to the image data. By way of example, an edge detector filter can be used for detecting objects in the image, or in case of a color image, a color filter might be used. In the art, many different filter algorithms are known for object detection. Normally, some of these filters are applied to the image, the different filters help to detect the different objects shown in the image. When the areas of interest are renewed at a first frame rate, such as 100 frames/second, the complete image 506 may be taken at a frame rate which is about 20 to 50 times lower than the first frame rate. This means that from time to time, the complete image may be taken and processed to process the whole image to look for new objects. If the areas of interest were detected at the first frame rate, the whole image was taken at a second frame rate and no other image processing unit were present, the system may not be able to detect new objects fast enough for a vehicle application. In this case, the other image sensor, in the case shown in FIG. 5, the 3D image sensor is provided detecting the same field of view as the 2D image sensor. Accordingly, it is possible to process the complete 2D image at a much lower frame rate than the processing of the areas of interest in the 2D images.

As shown in FIG. 5b, it may happen that the 3D image sensor recognizes a new object 520 indicated by the arrow shown in FIG. 5b. This object 520 can be detected by the fact that the relative distance to the vehicle changes. The 3D sensor control unit 108 (FIG. 1) can then inform the 2D sensor control unit 106 (FIG. 1) that another object was detected at a certain distance at a certain position of the image. The 2D sensor control unit 106 can then react in such a way that in the 2D images 506 a new area of interest 522 is generated to track the object 520 detected by the 3D sensor, as illustrated in FIG. 5c. The processing of the 2D images is then adapted in such a way that in addition to the areas of interest 508 and 510 a new area of interest 522 is observed and the object in said area is tracked. As can be seen from FIGS. 5a-5c, such an imaging system can reliable detect new objects in a field of view even when, for processing and computer power reasons, not the complete image is observed and processed in one of the images. Normally, the resolution of the 2D image sensor is much higher, meaning a much larger number of pixels. The implementation shown in FIGS. 5a-5c, allows an image processing of restricted areas of interest resulting in a highly reduced computing power. Accordingly, the complete 2D image 506 can be sampled at a much lower frame rate.

Figure 6:
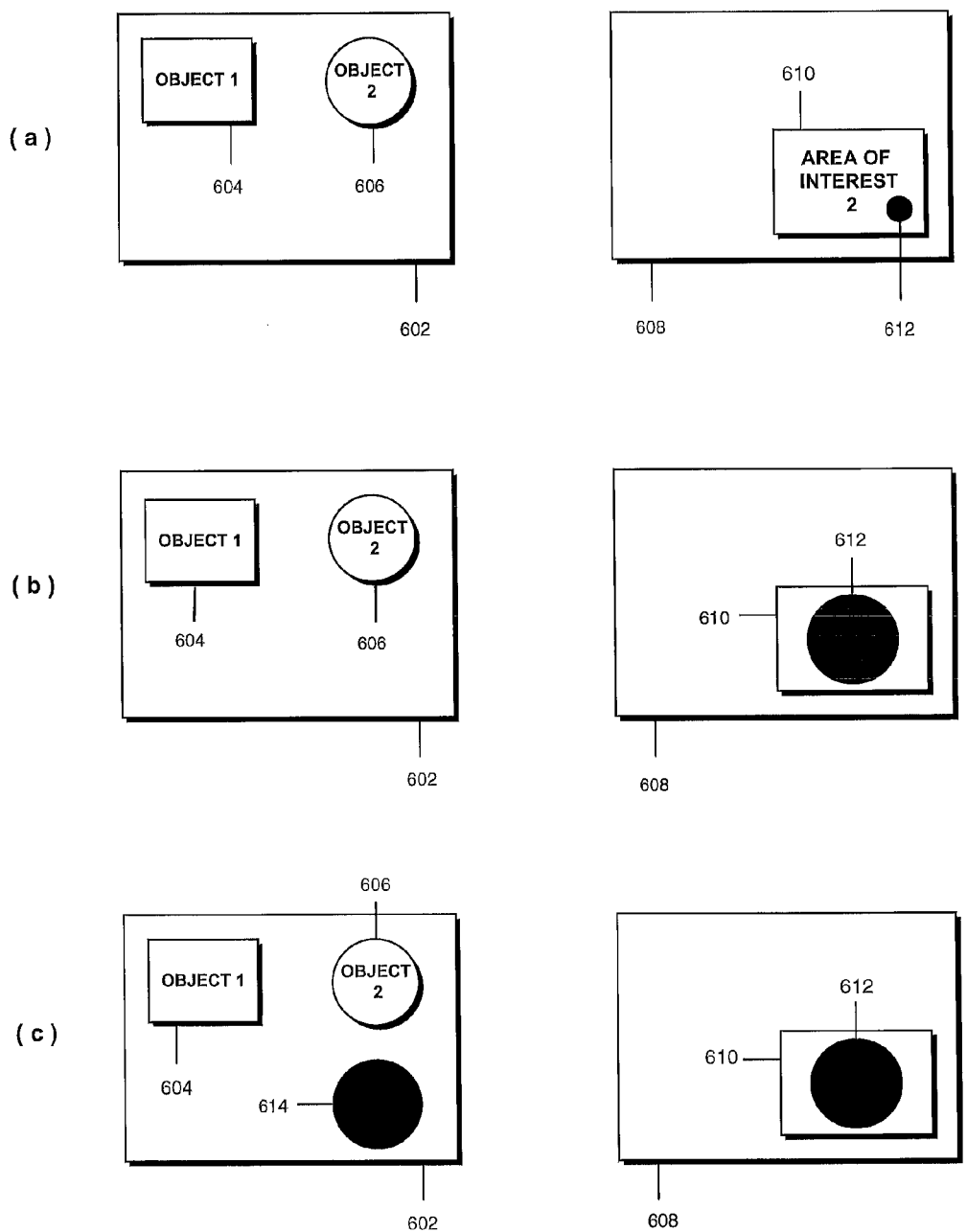
FIGS. 6a-6c show another example of images processed in a scenario where the processing of the 2D images provides object information to the 3D image processing as illustrated in the method of FIG. 4.

FIG. 6 illustrates another possible application of the imaging method of FIG. 4 in more detail. In the implementation shown in FIG. 6, the illustrations on the left side again show the image 602 of the 3D image sensor 104 (FIG. 1). As shown in FIG. 6a, two different objects, the first object 604 and the second object 606, are observed in the 3D images 602. This observation means that distance values and position and velocity vectors are not only detected for the area of the objects shown in FIG. 6, but these values are also transmitted to a control system, such as the control system 108 of FIG. 1, which determines how to react on the received information.

In FIG. 6, the images on the right side again show the 2D images 608. In this implementation, in FIG. 6a, an area of interest 610 is observed in more detail in the 2D images. In this area of interest 610, an object 612 is detected. As shown in FIG. 6b, the object 612 in area 610 rapidly became larger. This larger size of object 612 can lead to the assumption that the object 612 is rapidly approaching the vehicle. However, it is difficult to determine the exact distance of the object 612 in the 2D images 608. Accordingly, the position of the object 612 is transmitted to the 3D image sensor. The 3D image sensor can then determine and output the distance of the object 612 relative to the vehicle. As illustrated in FIG. 5c, the 3D image sensor now uses another object 614 to track the object 612 to determine the relative distance and velocity of the object 612. The 3D sensor can then reliably determine whether a collision of said object 614 with the vehicle will happen in the near future.

In the implementation shown in FIG. 5, the 3D sensor adds the new object 614 to the other objects 604 and 606. In this manner, the processing of the 2D images 608 provides additional information to the 3D sensor, allowing the 3D sensor to incorporate this new object 614 into its observation list.

In the two FIGS. 5 and 6, the two different applications or scenarios are shown as different example methods for processing the 2D and 3D images are illustrated. It is, however, also possible that the two scenarios shown in FIGS. 5 and 6 may be combined, so that each image sensor 102 and 104 (FIG. 1) provides information to the other image sensor 102 and 104 in case of an object considered dangerous to the vehicle.

In summary, the use of the two different image sensors 102 and 104 (FIG. 1) in a combined way may save on processing power need to process the images. Further, by utilizing both 2D and 3D sensors 102 and 104, the 2D images can be processed at a lower frame rate and only certain areas of interest in the 2D images need to be processed. However, from time to time, the entire 2D image will need to be processed to update the area of interest and identify other objects approaching the vehicle. The other image sensor, such as a 3D PMD sensor, can then send information about new objects in the current observation area. Accordingly, the frequency in the 2D image sensor to compute a whole image can be greatly reduced. Similarly, in the case of a suspicious object detected by the 2D image sensor, the system can ask the 3D image sensor for constant reporting of the distance of this object.

As less computing power is needed, the computing power can be used for reliably detecting objects in the images by applying different filters on the image. Once an object is detected, the tracking of the object can be easy and straightforward. However, the detection of new objects is a difficult task and needs a lot of computing power. Due to the fact that computing power can be saved with this invention, more computing power can be used for the object detection. Accordingly, the detection rate may be improved.

Objects to be tracked in one series of images can be adjusted according to the object information retrieved from processing the other series of images. For example, objects to be tracked may be added or removed. Based on the retrieved object information a function of the vehicle is controlled. According to one example, the controlling of the function may include the deployment of passenger and/or pedestrian protection equipment, yet according to example, the controlling of the function may include controlling of an acceleration or deceleration of the vehicle, for example, through a cruise control unit or through altering the driver to change the speed of the vehicle via a driver interface unit.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1-6 may be performed by hardware and/or software. Additionally, an imaging system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed is:

1. A method for imaging the surrounding of a vehicle, the method comprising the steps of:
    taking a series of 2D images of the surrounding;
    taking a series of 3D images of the surrounding, the 3D images including depth information;
    determining at least one object in an area of interest in one of the series of images and tracking the object in the area of interest where objects are identified in the 3D images together with the object's position and velocity relative to the vehicle and identified in the 2D images with their position, for which the change in distance relative to the vehicle is considered to be larger than a predetermined distance change;
    processing the other of the series of images to retrieve object information from the other series of images;
    adjusting the objects to be tracked in the one series of images in accordance with the object information received from processing the other series of images transmitting the position of said object to a 3D imaging unit;
    requesting the determination of the relative distance to the vehicle of the object for which the position was transmitted;
    determining the relative distance of the object for which the position was determined in the 2D images; and
    tracking said object also in the 3D images.

2. The method of claim 1, where the 2D and the 3D images are processed to localize objects in a predetermined observation area of the images, the distance of which vary relative to the vehicle.

3. The method of claim 1, where the position and the velocity of the localized objects relative to the vehicle are determined.

4. The method of claim 1, where areas of interest are determined in the series of 2D images in which the movement of the objects is tracked.

5. The method of claim 1, where the distance of the objects relative to the vehicle is determined in the 3D images.

6. The method of claim 1, where the 3D images are processed to detect objects for which the distance change relative to the vehicle is larger than a predetermined value.

7. The method of claim 6, where the position and size information of the detected object retrieved from the 3D images is transmitted to a 2D imaging unit, the objects tracked in the 2D images being adapted to the information received from the 3D images.

8. The method of claim 6, where an additional area of interest in which the object detected in the 3D images is added in the 2D images.

9. The method of claim 1, where the 2D images are taken at a frame rate between 50 and 100 frames per second, whereas the 3D images are taken at a frame rate between 10 and 100 frames per second.

10. The method of claim 1, where objects in the images are detected by using different filter algorithms applied to the image data.

11. The method of claim 1, where for the 2D images a first frame rate is used for the image acquisition of the areas of interest with the tracked objects, whereas a second frame rate is used for the image acquisition of the whole 2D images.

12. The method of claim 11, where the second frame rate is 10 to 50 times smaller than the first frame rate.

13. The method of claim 1, where, when an object is tracked, the position vector in the recorded image and a velocity vector considering a series of images are determined for the tracked object.

14. The method of claim 1, where an alarm signal is generated when it is determined in one of the series of images that an object is approaching the vehicle a predetermined relative speed.

15. The method of claim 14, where the alarm signal is transmitted to a cruise control unit of the vehicle.

16. The method of claim 14, where the driver is informed when an object is closer to the vehicle than a predetermined distance.

17. The method of claim 1, where the series of images is processed taking into account the driving direction of the vehicle.

18. A system for imaging a vehicle surrounding, the system comprising:
 a 2D image sensor generating a series of 2D images of the vehicle surrounding;
 a 3D image sensor generating 3D images of the vehicle surrounding, where the 3D images have depth information;
 an image processing unit processing one of the series of images for detecting objects in the images to be tracked and processing the other series of images to retrieve object information, where objects are identified in the 3D images together with the object's position and velocity relative to the vehicle and identified in the 2D images with their position, for which the change in distance relative to the vehicle is considered to be larger than a predetermined distance change and where the image processing unit adjusts the objects to be tracked in one of series of images in accordance with the object information received from processing the other series of images and determining a relative distance to the vehicle of the objects by determination of the relative distance of said objects for which the position was determined in the 2D images;
 transmitting the position of said object to a 3D imaging unit; and
 tracking said object also in the 3D images.

19. The system of claim 18, where the 2D image sensor is a CMOS image sensor.

20. The system of claim 18, where the 2D image sensor is a CCED image sensor.

21. The system of claim 18, where the 3D image sensor is a photonic mixer device image sensor.

22. The system of claim 18, further including a 2D imaging unit comprising the 2D image sensor and a 2D sensor control unit.

23. The system of claim 18, further including a 3D imaging unit comprising the 3D image sensor and a 3D sensor control unit.

24. A cruise control system for a vehicle comprising a cruise control unit controlling the engine of the vehicle and further comprising:
 a 2D image sensor generating a series of 2D images of the vehicle surroundings;
 a 3D image sensor generating 3D images of the vehicle surroundings, the 3D images including depth information;
 an image processing unit processing one of series of images for detecting objects in the images to be tracked and processing the other series of images to retrieve object information, where objects are identified in the 3D images together with the object's position and velocity relative to the vehicle and identified in the 2D images with their position, for which the change in distance relative to the vehicle is considered to be larger than a predetermined distance change and where the image processing unit adjusts the objects to be tracked in one of the series of images in accordance with the object information received from processing the other series of images and determining a relative distance to the vehicle of the objects by determination of the relative distance of the object for which the position was determined in the 2D images;
 transmitting the position of said object to a 3D imaging unit; and
 tracking said object also in the 3D images.

25. The system of claim 24, where the 2D image sensor is a CMOS image sensor.

26. The system of claim 24, where the 2D image sensor is a CCED image sensor.

27. The system of claim 24, where the 3D image sensor is a photonic mixer device image sensor.

* * * * *

UNITED STATES PATENT AND TRADEMARK OFFICE
CERTIFICATE OF CORRECTION

| | |
|---|---|
| PATENT NO. | : 8,081,794 B2 |
| APPLICATION NO. | : 11/844890 |
| DATED | : December 20, 2011 |
| INVENTOR(S) | : Stiegler |

It is certified that error appears in the above-identified patent and that said Letters Patent is hereby corrected as shown below:

At column 3, line 30, "...sensor control units 108 and 108..." should be changed to -- sensor control units 106 and 108 --

At column 3, line 31, "...central processing unit 100..." should be changed to -- central processing unit 110 --

At column 4, lines 39–40, "...in FIG. 1,..." should be changed to -- In FIG. 2, --

At column 8, line 18, "...a control system, such as control system 108..." should be changed to -- a control unit, such as control unit 108 --

At column 10, line 36, claim 1, "...the other series of images" should be changed to -- the other series of images; --

Signed and Sealed this
Twenty-ninth Day of January, 2013

David J. Kappos
*Director of the United States Patent and Trademark Office*